United States Patent
Rubin

(10) Patent No.: US 8,066,218 B2
(45) Date of Patent: Nov. 29, 2011

(54) ANTI-MISSILE DEFENSE SUITE

(75) Inventor: Eugene S. Rubin, Newtown Centre, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 162 days.

(21) Appl. No.: 10/560,767

(22) PCT Filed: Jun. 10, 2004

(86) PCT No.: PCT/US2004/018616
§ 371 (c)(1),
(2), (4) Date: Dec. 13, 2005

(87) PCT Pub. No.: WO2005/056384
PCT Pub. Date: Jun. 23, 2005

(65) Prior Publication Data
US 2006/0249009 A1    Nov. 9, 2006

Related U.S. Application Data

(60) Provisional application No. 60/478,397, filed on Jun. 13, 2003.

(51) Int. Cl.
*B65D 3/00* (2006.01)
*B65D 47/00* (2006.01)
(52) U.S. Cl. ............... 244/1 TD; 244/121; 342/6; 342/9
(58) Field of Classification Search .................. 244/1 R, 244/1 TD, 121, 129.1; 102/336; 342/6, 9, 342/13–16
See application file for complete search history.

(56) References Cited

U.S. PATENT DOCUMENTS

| | | | | |
|---|---|---|---|---|
| 3,339,201 A | * | 8/1967 | Fischer et al. | 342/14 |
| 4,832,433 A | * | 5/1989 | de La Chapelle et al. | 385/24 |
| 4,852,455 A | * | 8/1989 | Brum | 89/1.14 |
| 4,934,273 A | * | 6/1990 | Endriz | 102/336 |
| 5,136,295 A | * | 8/1992 | Bull et al. | 342/15 |
| 5,269,132 A | * | 12/1993 | Loucks | 60/204 |
| 5,497,156 A | * | 3/1996 | Bushman | 342/9 |
| 5,585,594 A | * | 12/1996 | Pelham et al. | 102/336 |
| 5,786,786 A | * | 7/1998 | Small | 342/13 |
| 6,055,909 A | * | 5/2000 | Sweeny | 102/336 |
| 6,267,039 B1 | * | 7/2001 | Czarnecki | 89/1.11 |
| 6,304,583 B1 | * | 10/2001 | Ohmer et al. | 372/21 |
| 6,571,714 B1 | * | 6/2003 | Brum et al. | 102/336 |
| 6,683,555 B2 | * | 1/2004 | Carlson et al. | 342/14 |
| 2003/0071164 A1 | * | 4/2003 | Carlson et al. | 244/1 TD |

* cited by examiner

*Primary Examiner* — Timothy D Collins
*Assistant Examiner* — Philip J Bonzell
(74) *Attorney, Agent, or Firm* — Bourque & Associates, PA; Daniel J. Bourque; Daniel J. Long

(57) ABSTRACT

A system and method for an aircraft (10) that provides an IR decoy (12) for an incoming missile (18) to track instead of an engine (14) of the aircraft (10) is disclosed. The IR decoy (12) is deployed during or just after take off, and prior to landing to provide a signature (16) for any incoming missile (18). The IR decoy (12) provides a heat source (16) that has a higher radiant intensity than the hottest heat source on the aircraft (10), which is typically the engine (14), thereby providing a more attractive heat source for the missile (18). In another embodiment, a warning system (20) for an aircraft (10) detects an incoming missile (18), and deploys IR decoy (12) and creates an engine mask (22) by injecting an additive into the exhaust stream of the engine (14), thereby obscuring the radiation emanating from the engine (14).

13 Claims, 1 Drawing Sheet

ANTI-MISSILE DEFENSE SUITE

CROSS-REFERENCE TO RELATED APPLICATIONS

This application claims priority from U.S. Provisional Patent Application No. 60/478,397, entitled "Low Cost Aircraft Self Protection Suite," which was filed on Jun. 13, 2003.

TECHNICAL FIELD OF THE INVENTION

The present invention relates to an aircraft system and method for avoiding missiles and more particularly, relates to a warning, decoy, and masking system for an aircraft and related method.

DESCRIPTION OF THE RELATED ART

The availability of heat-seeking or infrared guided missiles to terrorists throughout the world poses a serious threat to aircraft. Unfortunately, commercial and transport aircraft have been targeted by terrorist. Terrorist have hijacked, bombed, shot down and sabotaged aircraft in the past. One way terrorist have targeted aircraft has been with man-portable (MANPADS) surface-to-air infrared missiles. These man-portable surface-to-air infrared missiles have a relatively limited range. Most man-portable surface-to-air infrared missiles are not a threat beyond approximately 10,000 feet in altitude.

During takeoff, a fully loaded commercial and transport aircraft climbs to a cruising altitude under full power. It is during this time that the aircraft radiates its largest IR signature and thus, becomes a desirable and easy target for a man-portable surface-to-air infrared missile. Commercial and transport aircraft are extremely vulnerable to man-portable surface-to-air infrared missiles during take-off and landing because of their large IR signatures, reliance on established flight patterns, and lack of maneuverability.

Man-portable surface-to-air infrared missiles or other similar ordinance launched at the aircraft rely on heat, or other infrared or light energy to track the aircraft. Typically, a MANPADS heat tracking or infrared missile launched at an aircraft strikes the engine of the aircraft causing its demise. Since the engine of the aircraft is the largest source of heat or radiation, the engine is an easy target for a heat tracking missile.

There are a number of systems that detect an incoming missile and attempt to deceive it by creating false targets to divert the incoming missile. One such system ejects an infrared radiation source, such as a flare, from the aircraft upon detection of a threat. The problems with this system are that the energy in the flare cannot be maintained and there is a potential for a land fire when the flare hits the ground. Moreover, the systems in the prior countermeasure art are very expensive, and in some instances, not very effective.

SUMMARY OF THE INVENTION

The present invention provides an IR decoy system for an aircraft that is used or deployed during or just after take off and prior to landing, to provide a decoy signature or target for any incoming missile launched at the aircraft. The IR decoy provides a heat source or signature that is brighter, stronger, and larger, or that has a higher radiant intensity than the hottest heat source on the aircraft, which is typically the engine, thereby providing a more attractive heat source or target for the missile or projectile. Thus, the present invention takes advantage of the benefits of a decoy while avoiding its deterants by employing a towed decoy with a constant source of radiation.

The present invention also includes a warning system for an aircraft that detects an incoming missile. Upon detection of an incoming missile, a towed IR decoy is deployed. The IR decoy provides a heat source or signature that is brighter, stronger, and larger, or that has a higher radiant intensity than the hottest heat source on the aircraft, which is typically the engine, thereby providing a more attractive heat source or target for the missile or projectile. As an additional feature, an engine mask or signature reduction is deployed. The engine mask hides or reduces the radiation emanating from the engine, thereby reducing the size of the needed decoy or in the limit, reducing the probability that the missile will be able to track the engine. The engine mask is created by introducing an additive into the exhaust stream of an engine of the aircraft.

It is important to note that the present invention is not intended to be limited to a system, which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims. For example, the warning system may be eliminated and the decoy ejected at each take-off and landing. Further, the decoy may be modulated to create false targets.

BRIEF DESCRIPTION OF THE DRAWINGS

These and other features and advantages of the present invention will be better understood by reading the following detailed description, taken together with the drawings wherein.

DETAILED DESCRIPTION

Figure 1:
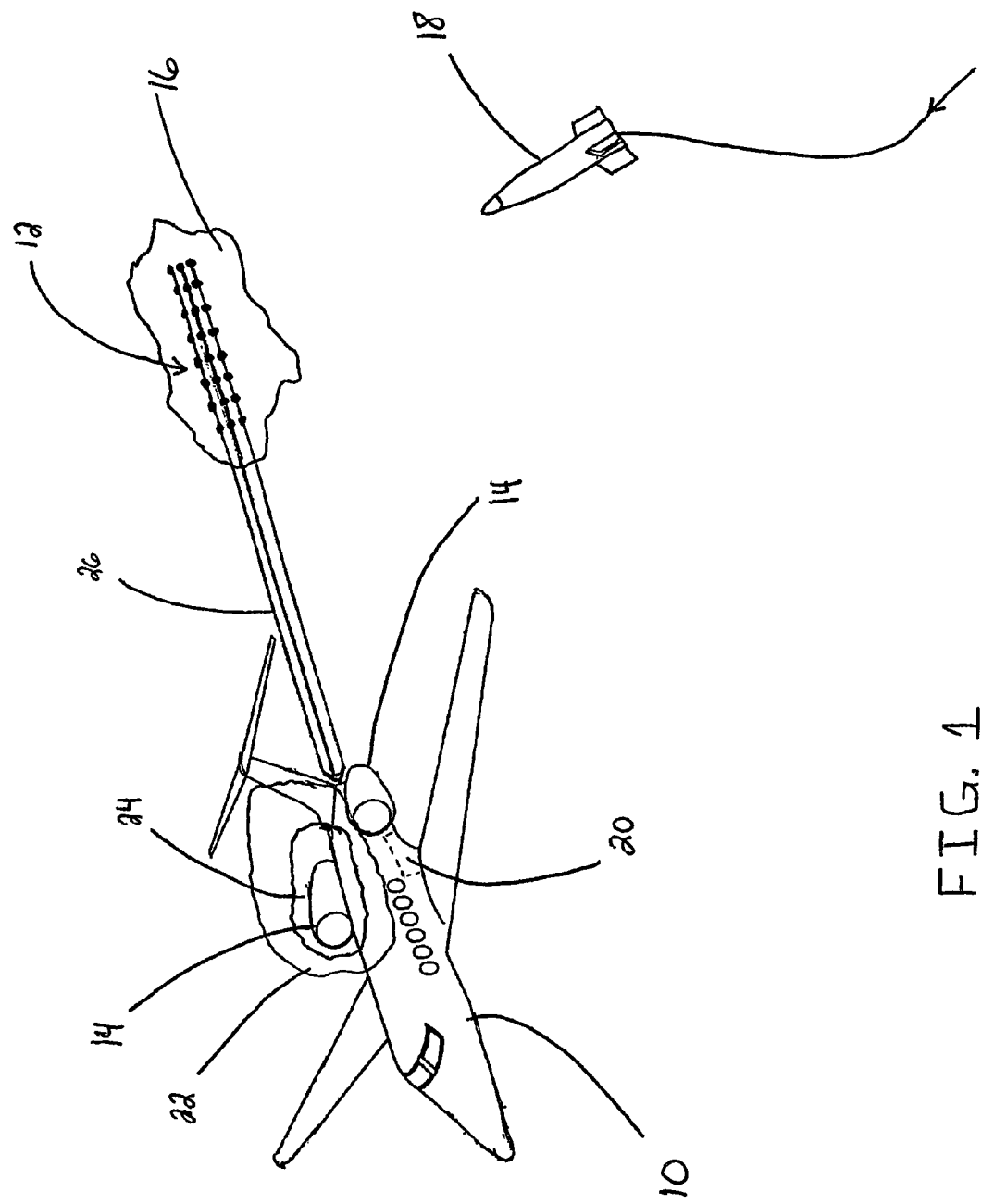
FIG. 1 is a perspective view of an aircraft towing an IR decoy and providing an engine mask according to the present invention.

FIG. 1 shows an aircraft 10 towing a deployed IR decoy 12 according to the present invention. Although a fixed wing aircraft is shown in the drawing, the present invention can also be practiced with non-fixed wing aircraft, such as a helicopter. Since all objects emit infrared radiation at temperatures above absolute zero, all aircraft 10 are potential infrared missile targets. Most MANPADS missiles or projectiles 18 that are launched at the aircraft 10 rely on heat, or other infrared or light energy emitted from the aircraft 10 to track the aircraft 10. It is common for these heat tracking or infrared missiles 18 to track an engine 14 of the aircraft 10 because the engine 14 is usually the largest heat source on the aircraft 10, thereby providing the largest signature or target for the missile 18. The engine 14 plume emission is the primary source of radiation for frontal and beam aspects of the aircraft 10 while the hot jet engine 14 parts are a major contributor to the aft aircraft 10 emission.

In accordance with one aspect of the present invention, the IR decoy 12 is deployed from the aircraft 10 to produce a heat source or signature 16 that is brighter, stronger, and larger, or that has a higher radiant intensity than the hottest heat source on the aircraft 12, which is typically the engine 14, thereby providing a more attractive heat source or target for the missile or projectile 18. The IR source is distributed via optical fibers to selected small apertures within the drogue IR decoy 12. A towing cable 26 is used between the aircraft 10 and the IR decoy 12 to reduce the stress on the IR decoy 12 during deployment and retraction. The IR decoy 12 generates energy in more than one spectral band, provides extended area burning, and has a dynamic trajectory. At least one of the IR decoys 12 is towed behind each engine 14 of the aircraft 10.

The IR decoy 12 is deployed or released from the aircraft 10 when in use and retracted into the aircraft 10 when not in use. In one embodiment, the IR decoy 12 is deployed and retracted from the aircraft 12 with a motorized reel. In another embodiment, the IR decoy 12 is deployed and retracted from the aircraft 12 with a Fast Deploy and Retract (FDAR) device manufactured and sold by BAE Systems. The FDAR device efficiently and effectively deploys and retracts the IR decoy 12. The FDAR device is capable of deploying multiple IR decoys 12, which is valuable when one of the IR decoys 12 is lost due to hostile action or an accident.

In the preferred embodiment, the towing cable 26 and the IR decoy 12 are released but tethered or towed from the aircraft 10 during or soon after take off, and just prior to landing. For example, when the aircraft 10 is descending to land as shown in FIG. 1, the IR decoy 12 may be released at approximately 10,000 feet and maintained in the released position until or just prior to landing. When the aircraft 10 is taking off, the IR decoy 12 may be released just after or during take off and maintained in the released position until an altitude of approximately 10,000 feet altitude is reached. The deployment of the IR decoy 12 will depend on the range of the missiles or projectiles 18, and thus, it is contemplated by the present invention that the deployment of the IR decoy 12 may be adjusted according to the range of the missiles or projectiles 18 to reduce the risk of being hit by the missile or projectile 18.

In one embodiment, the IR decoy 12 includes cables with optical fibers operatively connected to an electrical source on-board the aircraft 10. The electrical source distributes energy via the optical fibers to selected apertures within the IR decoy 12. In the preferred embodiment, the optical fibers terminate at various lengths to create the effect of an extended IR signature, which is beneficial in attracting the incoming missile or projectile 18. When the IR decoy 12 is deployed or released from the aircraft 10, the electrical source powers the fiber optic cables, and the fiber optic cables radiate energy where they terminate, thereby producing an off-board heat source or signature 16. Efficiency is maximized when the electrical source modulates the energy to the IR decoy 12, thereby producing very high peak radiation. Because the electrical source is continuously supplying power to the IR decoy 12, there is no burn out as is common in ejected flares. The IR decoy 12 is tethered and powered from aircraft 10 until the threat of the incoming missile or projectile 18 has dissipated. Thereafter, the IR decoy 12 may be retracted. In the preferred embodiment, the special output of the IR decoy 12 matches that of the source being protected. In one embodiment, high power fiber lasers are used to power the optic fibers of the IR decoy 12. The fiber lasers when shifted from the primary wavelengths to the correct wavelength for our needs, produce at least three times the radiation output of the engine 14 that it is protecting. In other words, the jam-to-signal ratio is three to one. Multi-fiber laser arrays capable of >7 KW are commercially available from Ytterbium. Thulium fiber lasers in the Kilowatt level will be available shortly. In another embodiment, the IR decoy 12 includes electrically heated photonic band gap elements, which produce selective emission significantly greater than the equivalent black body sources.

The IR decoy 12 is used to produce a heat source or signature 16 that is brighter, stronger, and larger, or that has a higher radiant intensity than the hottest heat source on the aircraft 12, which is typically the engine 14. The IR decoy 12 is deployed to attract or divert the incoming infrared missile or projectile 18 away from the engine 14 or other hot spot of the aircraft 10. Specifically, the IR decoy 12 causes the incoming infrared missile or projectile 18 to break its lock on the engine 14 of the aircraft 12, veer off course toward the IR decoy 12, and miss the aircraft 12.

In accordance with another aspect of the present invention, the aircraft 10 has a warning system 20. The warning system 20 is preferably a Threat Launch Detector (TLD) warning system developed by BAE Systems. The TLD warning system detects and warns against short burn and motor less threats, such as man-portable surface-to-air infrared missiles, and direct fire projectiles. The TLD system "recognize" launch characteristics (i.e., temporal profiling) with sufficient accuracy to greatly reduce the possibility of false alarms. Other warning systems may be used with the present invention including but not limited to the ALQ-156, AAR-56 or AAR-47 systems developed by BAE Systems.

The warning system 20 detects incoming missiles or projectiles 18. Upon detection of the missile or projectile 18, the warning system 20 causes the IR decoy 12 to be deployed or released and an engine mask 22 may be produced. As previously described, the IR decoy 12 is used to produce a heat source or signature 16 that is brighter, stronger, and larger, or that has a higher radiant intensity than the hottest heat source on the aircraft 12, which is typically the engine 14, thereby providing a more attractive heat source or target for the missile or projectile 18.

The engine mask 22 is used to mask or hide the heat energy radiation 24 or hot spot emanating from the engine 14, thereby reducing the probability that the missile 18 will track the engine 14. The engine mask 22 is commonly referred to as an extinction coefficient. The engine mask 22 is created by adding an additive into an exhaust stream of the engine 14. The additive may be oil or other liquid. In the preferred embodiment, graphite oil is injected directly into the engine's 14 exhaust stream upon detection of the incoming missile or projectile 18. A venturi is created in the exhaust stream to provide the suction necessary to draw the graphite smoke for dissemination. Five to ten pounds of graphite oil are added to the engine's 14 exhaust to produce an excellent obscurant and to provide a continuous curtain until the aircraft reaches an altitude of about 10,000 feet. This curtain of graphite smoke significantly reduces the heat energy radiation 24 or hot spot emanating from the engine 14. The curtain of graphite smoke is opaque to mid-band IR and will reduce the heat energy radiation 24 or hot spot emanating from the engine 14 or the signature of the aircraft 10.

Specifically, adding fuel additive to the exhaust stream of the engine 14 causes a mist, fog, or mask. The oil fog has a very high infrared broad based extinction coefficient. The engine mask 22 minimizes the radiation 24 from the engine 14, thereby making it a less attractive target for the incoming missile 18, while the IR decoy 12 becomes even a greater or higher visibility target. Multispectral water may also be used as an additive. Multispectral water, when exhausted, is not visible to the eye; however, it is an extremely effective in masking the near and mid-IR threat regions.

In an alternative embodiment, commercial oil smoke generators may be used to create the obscurant or engine mask 22.

The IR decoy 12 and the engine mask 22 create a false or decoy target, and reduce the IR signature or heat energy radiation 24 of the aircraft 10, respectively. The higher the radiant intensity of the IR decoy 12, the more attractive it becomes for incoming infrared missile or projectile 18. The intensity of the IR decoy 12 and the density of the engine mask 22 are inversely related. For example, the higher the intensity of the IR decoy 12, the less dense the engine mask 22 needs to be to divert the incoming missile or projectile 18 from the aircraft 10. Conversely, the more dense the engine mask 22, the less intense the IR decoy 12 needs to be to divert the incoming missile or projectile 18 from the aircraft 10.

In use, the warning system 20 detects a nearing missile or projectile 18. Upon detection of the missile or projectile 18, the IR decoy 12 is deployed or released, and the engine mask 22 may be produced. The IR decoy 12 provides a heat source or signature 16 that is brighter, stronger, and larger, or has a higher radiant intensity than the hottest heat source on the aircraft 12, which is typically the engine 14, thereby providing a more attractive heat source or target for the missile or projectile 18. The engine mask 22 is used to mask or hide the radiation 24 emanating from the engine 14, thereby reducing its heat signature and making it a less attractive target for the incoming missile 18.

In another aspect of the present invention, the warning system 20 detects a nearing missile or projectile 18. Upon detection of the missile or projectile 18, the IR decoy 12 is deployed. After further detection by the warning system 20 that the nearing missile or projectile 18 is still tracking the aircraft 10, engine mask 22 that was not produced, as the case may be, is now activated.

In still another aspect of the present invention, the warning system 20 detects a nearing missile or projectile 18. Upon detection of the missile or projectile 18, the IR decoy 12 is deployed or released, and/or the engine mask 22 is produced. After further detection by the warning system 20 that the nearing missile or projectile 18 is still tracking the aircraft 10, the deployed defensive measure is enhanced. For example, if the IR decoy 12 was initially deployed, the intensity of the IR decoy 12 is increase. If the engine mask 22 was initially produced, the density of the engine mask 22 is increased by increasing the amount of additive added per time.

The IR decoy 12 and/or the engine mask 22 will "blind" the incoming infrared missile or projectile 18, thereby causing the blinded missile or projectile 18 to strike the IR decoy 12, follow its original ballistic trajectory to the ground, or continue on its last indicated flight path. In combination with deploying these defensive measures, the pilot of the aircraft 10 may use a climb-out or drop-down maneuver to avoid the distracted or blinded incoming missile or projectile 18.

The present invention is not intended to be limited to a system which must satisfy one or more of any stated or implied object or feature of the invention and is not be limited to the preferred, exemplary, or primary embodiment(s) described herein. Modifications and substitutions by one of ordinary skill in the art are considered to be within the scope of the present invention, which is not to be limited except by the following claims.

The invention claimed is:

1. A method for producing a decoy infrared signature to direct an incoming infrared guided missile away from an aircraft infrared signature and to the decoy infrared signature, the method comprising:
    deploying a towed IR decoy during at least one aircraft flight time period including aircraft take off and aircraft landing;
    powering the towed IR decoy by a laser source located within said aircraft;
    amplifying said laser source with an amplifier located within said aircraft to produce an IR decoy infrared signature;
    wherein the IR decoy infrared signature is of a magnitude greater than the infrared signature of said aircraft, and wherein said IR decoy infrared signature includes infrared energy in more than one spectral band;
    distributing the IR decoy infrared signature by means of a plurality of optical fibers of various lengths coupled to a plurality of small apertures within the IR decoy;
    detecting an incoming infrared guided missile with a warning system, and responsive to said detecting, further including the act of masking an infrared signature of at least one engine of the aircraft by causing a first amount of exhaust obscurant to be added into an exhaust stream of said at least one engine of the aircraft; and
    retracting the towed IR decoy after the aircraft reaches an altitude that is beyond a range of an infrared guided missile or proximate the time immediately preceding or after the aircraft has landed.

2. The method for producing a decoy infrared signature to direct an incoming infrared guided missile away from an aircraft according to claim 1, wherein the act of retracting the towed IR decoy after take off is performed at approximately 10,000 feet.

3. The method for producing a decoy infrared signature to direct an incoming infrared guided missile away from an aircraft according to claim 1, further comprising deploying the towed IR decoy when the warning system has detected the incoming infrared guided missile, and retracting the towed IR decoy when the warning system is not detecting the incoming infrared guided missile.

4. The method for producing a decoy infrared signature to direct an incoming infrared guided missile away from an aircraft according to claim 1, further comprising repeating the detecting act to detect the incoming infrared guided missile with the warning system; and responsive to said repeated detecting act, increasing the magnitude of the towed IR decoy by rapid modulation of the laser source.

5. The method for producing a decoy infrared signature to direct an incoming infrared guided missile away from an aircraft according to claim 4, further comprising increasing the first amount of the exhaust obscurant added into said exhaust stream of said at least one engine of the aircraft in response to said detecting act.

6. An aircraft system for producing a decoy infrared signature to direct an incoming infrared guided missile away from an aircraft infrared signature and to the decoy infrared signature, the system comprising:
    a towed IR decoy, for producing the decoy infrared signature;
    a photonic source located within said aircraft powering a plurality of fiber optic cables, said plurality of fiber optic cables having various lengths, each varying length fiber optic cable having a terminating point at a predetermined distance from a terminating point of one or more other of said plurality of fiber optic cables, for directly radiating IR energy into the atmosphere from the terminating points, wherein the various lengths of fiber optic cables and distance between said terminating points provides said decoy infrared signature,
    an amplifier located with said aircraft wherein the amplifier amplifies said IR decoy infrared signature to a magnitude greater than the infrared signature of said aircraft, and wherein said IR decoy infrared signature includes infrared energy in more then one spectral band;

a warning system, for detecting an incoming infrared guided missile;

an aircraft engine obscurant system, responsive to said detection of said incoming infrared guided missile from said warning system, for masking an infrared signature of at least one engine of said aircraft by causing a first amount of exhaust obscurant to be added into an exhaust stream of said at least one engine of the aircraft; and a deployment and retraction device, for deploying and set retracting the towed IR decoy proximate at least one tithe period including at least aircraft take off and aircraft landing.

7. The aircraft system according to claim 6, wherein the photonic source is a high power fiber laser.

8. The aircraft system according claim 6, wherein the IR decoy includes a heat source.

9. An aircraft system for detecting and avoiding an incoming infrared guided missile, the system comprising:

a warning system, for detecting an incoming infrared guided missile;

a towed IR decoy, coupled to a laser source, the laser source being located within the aircraft, for producing a decoy infrared signature, said towed IR decoy coupled to said laser source within the aircraft by way of a plurality of fiber optic cables, wherein said plurality of fiber optic cables have various lengths, each varying length fiber optic cable having a terminating point a distance from a terminating point of one or more other of said plurality of fiber optical cables, for directly radiating IR energy into the atmosphere from the terminating points, wherein the various lengths of fiber optic cables and distance between said terminating points provides said decoy infrared signature;

an amplifier located within the aircraft wherein the amplifier amplifies said IR decoy infrared signature to a magnitude greater than an infrared signature of said aircraft, and wherein said IR decoy infrared signature includes infrared energy in more than one spectral band;

a deployment and retraction device, for deploying the towed IR decoy when the warning system has detected the incoming missile, and for retracting the towed IR decoy when the warning system is not detecting the incoming missile; and an aircraft engine obscurant system, responsive to said detection of said incoming infrared guided missile from said warning system, for masking an infrared signature of at least one engine of the aircraft by causing a first amount of exhaust obscurant to be added into an exhaust stream of said at least one engine of the aircraft.

10. The aircraft system according to claim 9, wherein the exhaust obscurant includes an additive that is selected from a group consisting of oil, graphite-oil, multispectral water or a commercial oil smoke generator.

11. The aircraft system according to claim 9, wherein said fiber optic cables at various lengths provide an extended IR signature to produce said IR decoy infrared signature.

12. The aircraft system according to claim 9, wherein the towed IR decoy includes heat source.

13. The aircraft system according to claim 9, wherein said laser source is a high power fiber laser.

\* \* \* \* \*